United States Patent [19]

Powers et al.

[11] Patent Number: 5,286,804
[45] Date of Patent: Feb. 15, 1994

[54] HALOGENATION OF STAR-BRANCHED BUTYL RUBBER WITH IMPROVED NEUTRALIZATION

[75] Inventors: Kenneth W. Powers, Berkeley Heights; Hsien C. Wang, Edison; Robert N. Webb, Madison; James V. Fusco, Red Bank, all of N.J.; Hans F. Vanbrackle, Baker; Michael F. McDonald, Jr., Greenwell Springs, both of La.

[73] Assignee: Exxon Chemical Patents Inc., Linden, N.J.

[21] Appl. No.: 761,211

[22] Filed: Sep. 17, 1991

[51] Int. Cl.$^5$ .................... C08C 19/12; C08F 8/18
[52] U.S. Cl. .................... 525/333.4; 525/351; 525/353; 525/355; 525/356; 525/357; 525/358; 525/359.1
[58] Field of Search ............ 525/355, 333.4, 356, 525/357, 358, 359.1, 351, 353

[56] References Cited

U.S. PATENT DOCUMENTS

| | | |
|---|---|---|
| 2,732,354 | 1/1956 | Morrissey et al. . |
| 2,958,667 | 11/1960 | Eby et al. . |
| 3,099,644 | 7/1963 | Parker et al. . |
| 4,252,918 | 2/1981 | Ikeda et al. ............ 525/333 |
| 5,077,345 | 12/1991 | Newman et al. ............ 525/355 |

FOREIGN PATENT DOCUMENTS

| | | |
|---|---|---|
| 0320263A | 6/1989 | European Pat. Off. . |
| WO91/13102 | 9/1991 | PCT Int'l Appl. . |
| 746692 | 3/1956 | United Kingdom . |
| 1051944 | 12/1966 | United Kingdom . |

*Primary Examiner*—Nathan M. Nutter
*Assistant Examiner*—John M. Cooney, Jr.
*Attorney, Agent, or Firm*—J. E. Schneider; M. B. Kurtzman

[57] ABSTRACT

A process for halogenating star-branched butyl rubber is provided wherein water and a wetting agent or wetting agent precursor are added to a solution comprising the star-branched butyl rubber, solid particles of branching agent and an organic solvent prior to the neutralization step to increase the rate of neutralization of the hydrogen halide by-product of the halogenation reaction.

18 Claims, 4 Drawing Sheets

HALOGENATION OF STAR-BRANCHED BUTYL RUBBER WITH IMPROVED NEUTRALIZATION

BACKGROUND OF THE INVENTION

1. Field of the Invention

The present invention relates to a halogenation process for star-branched polymers with improved neutralization of the hydrogen halide by-product resulting from the halogenation. The term "star-branched" relative to polymers is used herein to refer to polymers comprising a plurality of branches, typically linear, emanating from the same or closely spaced location on the polymer backbone.

2. Description of Information Disclosures

Halogenation processes in which a polymer is reacted with a halogenation agent to produce a halogenated polymer containing chemically bound halogen and a hydrogen halide by-product followed by neutralization of the hydrogen halide by-product by contacting the halogenation reaction product with an alkaline material which reacts with the hydrogen halide by-product are well known.

European Patent Application 88311634.5 filed Dec. 8, 1988 (Publication No. EP 0320 263 A2 published Jun. 14, 1989), the teachings of which are hereby incorporated by reference, discloses star-branched copolymers of a $C_4$ to $C_7$ isomonoolefin and a $C_4$ to $C_{14}$ multiolefin (i.e., star-branched butyl rubber), and a process for halogenating these star-branched polymers, including a halogenation process in which the star-branched copolymer is dissolved in an organic solvent.

U.S. Pat. No. 3,099,644 (Parker et al.) is directed to a halogenation process for butyl rubber. It discloses that in the early production of chlorobutyl rubber before the current solvent replacement process was developed, the practice was to recover dry regular butyl rubber and then redissolve it to prepare a solution for halogenation. In recovering regular butyl, the practice is to withdraw a slurry of the polymer in methyl chloride diluent from the reactor and introduce it into a tank of hot water to flash off the methyl chloride and unreacted monomers. This water regularly contains a small amount of polymer dispersing agent such as zinc stearate or calcium stearate or other metal soap to prevent the polymer particles from agglomerating and to keep them dispersed in the water. Much of this dispersing agent is picked up by the polymer so that when that process is used, the butyl solutions submitted to halogenation, unless specially treated, contain small amounts of these polymer dispersing agents. These act as emulsifying agents when the polymer solution is treated with dilute solution of caustic in the neutralization step (col. 3, lines 58 to 72). The presence of these dispersing agents was perceived as a problem, as discussed in Parker et al. Zinc stearate was particularly objectionable because it caused scorching and prevulcanization of the halobutyl during finishing as discussed in Eby (U.S. Pat. No. 2,958,677 col. 2 lines 1 to 5) and its use was eventually abandoned. However, even calcium stearate caused extremely slow settling which was perceived as undesirable (col. 3 line 70 to col. 4 line 2 of U.S. Pat. No. 3,099,644) and necessitated the use of very special and restrictive conditions (i.e. pH control and long residence time settlers, as disclosed on the Parker et al. Patent) to make the process operable.

Subsequently, when the currently used solvent replacement process was developed, the solution for halogenation was prepared directly from the methyl chloride slurry exiting the polymerization reactors by solvent replacement and the polymerization solution contained no "undesirable" stearates. The finding, in accordance with the present invention, that the presence of stearic acid or its in-situ generation in the halogenation solution prior to halogenation actually improves neutralization rate is surprising and contrary to the teachings of prior art.

When the halogenation of the star-branched copolymer of a $C_4$ to $C_7$ isomonoolefin and $C_4$ to $C_{14}$ multiolefin, hereinafter referred to as "star-branched butyl rubber", is performed by contacting a solution comprising the star-branched butyl rubber and an organic solvent, the solution also comprises solid particles of unreacted branching agent that was used to prepare the star-branched butyl rubber. Although not wishing to be bound by theory, it is believed that at least a portion of the unreacted solid branching agent particles adsorb a portion of the hydrogen halide by-product of the halogenation process. The solid branching particles with or without adsorbed hydrogen halide are believed to be the cause of the observed decreased rate of neutralization of the hydrogen halide by-product of the halogenation of star-branched butyl rubber because during the neutralization step of the reaction product of the halogenation process of the present invention, two phases exist, namely, a hydrocarbon phase and a water phase. The hydrogen halide by-product diffuses into the water phase to be neutralized by the aqueous alkaline material. However, it is more difficult for the hydrogen halide adsorbed on the solid branching agent particles to diffuse into the aqueous phase during the neutralization process. Hence, the neutralization rate of star-branched butyl rubber is slower than the neutralization rate of conventional butyl rubber (i.e., non-star-branched butyl). A slow neutralization rate has a number of disadvantages, such as a reduced throughput rate and or the necessity of providing additional equipment (more or longer pipes) to permit longer residence time to complete the neutralization.

It would be desirable to increase the rate of neutralization to increase the throughput rate, to require less neutralization residence time, and to minimize the possibility of incomplete neutralization and thereby increase the stability and consistency of the halogenated copolymer.

It has been found that one method that could be used to increase the neutralization rate would be to remove the solid particles of unreacted branching agent prior to the halogenation step from the solution comprising the star-branched butyl rubber, the solid unreacted branching agent particles and the organic solvent. It has also been found that another method that could be used to increase the neutralization rate is to change the nature of the unreacted solid branching agent particles prior to the halogenation step to increase their diffusion from the hydrocarbon phase into the water phase during the neutralization step.

One method of removing the unreacted solid particles of branching agent from the solution comprising the solid particles, the star-branched butyl rubber and an organic solvent comprises adding another solvent (i.e., a cosolvent) to said solution prior to the halogenation step. Suitable solvents to dissolve the branching agent include toluene, methylene chloride, methyl chloride and mixtures thereof in an amount sufficient to dissolve the solid particles present in said solution. Although such a method results in an increased neutralization rate of the hydrogen halide by-product of the halogenation step, it has disadvantages, particularly for large scale production, since it requires the use of two different solvents and subsequent recovery of the two different solvents.

Therefore, a method that would change the nature of the unreacted solid branching agent particles to make them hydrophilic would be preferable to the method of dissolving the solid particles by use of two different solvents.

It has now been found that the neutralization rate of the hydrogen halide by-product of the halogenation of a star-branched butyl rubber can be increased by the addition of water and specified wetting agent or wetting agent precursors prior to the halogenation step, to a solution comprising the star-branched butyl rubber, the solid unreacted branching agent particles and an organic solvent, thereby producing hydrophilic solid branching agent particles in said solution.

SUMMARY OF THE INVENTION

In accordance with the invention, there is provided in a process for halogenating a star-branched copolymer of a $C_4$ to $C_7$ isomonoolefin and a $C_4$ to $C_{14}$ multiolefin, which comprises the steps of:

(a) contacting a solution comprising said copolymer, solid particles of a branching agent and an organic solvent for said copolymer with a halogenating agent at halogenation conditions to produce a reaction product comprising the corresponding halogenated copolymer and hydrogen halide;

(b) neutralizing said hydrogen halide by contacting said reaction product with an aqueous alkaline material to react with said hydrogen halide at neutralization conditions, and (c) recovering said halogenated copolymer;
the improvement which comprises adding to said solution, prior to said step (b), water and a wetting agent or a precursor of said wetting agent.

DETAILED DESCRIPTION OF THE INVENTION

Water and a wetting agent or a wetting agent precursor are added to a solution comprising a star-branched copolymer of a $C_4$ to $C_7$ isomonoolefin and a $C_4$ to $C_{14}$ multiolefin (i.e., star-branched butyl rubber), unreacted solid particles of the branching agent used to prepare the star-branched copolymer and an organic solvent.

The Solution

The organic solvent in the solution to which water and the wetting agent or wetting agent precursor are added may be a hydrocarbon or a halogenated derivative of a hydrocarbon, for example, hexane, heptane, naphtha, branched chain paraffins, straight chain mineral spirits, cyclohexane, other cycloparaffins, benzene, toluene, chloroform and the like and mixtures thereof. Preferred organic solvents include $C_3$ to $C_{12}$, more preferably $C_4$ to $C_8$ substantially inert hydrocarbons such as hexane, cyclohexane, cyclopentane, n-heptane, n-pentane and mixtures thereof. The most preferred organic solvent for the practice of this invention is hexane.

The star-branched butyl rubber which is present in the solution comprising the organic solvent may be a star-branched butyl rubber such as those described in European patent application 88311634.5 filed Dec. 8, 1988 (Publication No. EP 0320 263A published Jun. 14, 1989).

The star-branched butyl rubber is also described in paper No. 21 entitled *"Star-branched Butyl", A Novel Butyl Rubber For Improved Processability* presented at the Rubber Division of the American Chemical Society, Mexico City, Mexico, May 9–12, 1989 by H. C. Wang, et al. The star-branched butyl rubbers have highly branched structures by incorporating, during polymerization, crosslinking or cationically active comonomers or agents. These agents are referred to as branching agents and preferably are, or contain, structural features which are soluble in the polymerization diluent. More preferably, such branching agents are used in conjunction with, or are themselves, stabilizers for the polymer slurry when such a slurry results, e.g., butyl rubber in methyl chloride (see U.S. Pat. Nos. 4,242,710, 4,358,560 and 4,474,924).

The introduction of branching, preferably long chain branching, results in a modification of the molecular weight distribution, and molecular chain configuration.

The nature of the polymerization diluent can have important effects on the polymer produced. Similarly important is the solubility of the branching agent under polymerization conditions throughout the entire course of the polymerization. As butyl is normally produced by slurry polymerization in methyl chloride diluent, the polymer precipitates out of solution as it is formed. Consequently, when a branching agent is incorporated, it is removed from solution and may become buried within the polymer particle so that the additional sites are no longer available in the solution phase for subsequent reaction. The actual branching reactions may be forced to occur within the precipitated butyl polymer in a very different and much more poorly controlled way than had the branching agent remained in solution. Gel formation is much more likely when the reactions occur within the precipitated polymer than when they occur more homogeneously in the solution phase. Furthermore, the amount and nature of the gel produced is highly dependent upon the catalyst quenching conditions and control is rendered very difficult. Solution polymerization of butyl rubber in diluents such as aliphatic hydrocarbons e.g., pentane, hexane, or heptane is advantageous from a control viewpoint, when it is desired to produced highly branched polymers. Optimum control of the branching reactions is achieved when they are totally effected homogeneously in solution and then all catalyst and active species are killed by quenching prior to precipitation of the polymer. As noted above, this can be accomplished by polymerizing butyl rubber in a suitable inert diluent which is a good solvent for the polymer and the branching agent. However, branched structures, which significantly modify the molecular weight distribution can also be achieved through the inclusion of reactor-diluent-soluble moi- eties containing multiple, cationically reactive sites, particularly in conjunction with slurry stabilizers.

Slurry stabilizers stabilize butyl dispersions produced during polymerization in a diluent such as methyl chloride, and prevent the mass agglomeration of slurry particles. Hence, slurry stabilizers make it possible to produce dispersed butyl particles containing gel in the reactor without depositing fouling rubber containing gel on the heat transfer surfaces. Through the use of slurry stabilizers it is possible to produce a modified butyl rubber containing as much branching and/or gel as is desired in a practical manner without interfering with the ability to wash the reactor in order to prepare it for reuse.

Furthermore, through appropriate choice of the branching agent and the amount used, it is possible to exert considerable control over the branching process so that the desired changes in molecular weight distribution are achieved. Since crosslinking agents tend to introduce random long chain branching, they modify the entire molecular weight distribution of the polymer. On the other hand, soluble moieties containing multiple reactive sites can be used to introduce a controlled amount of a high molecular weight branched fraction into the distribution without modifying the entire molecular weight distribution of the polymer. A small amount of a very highly functional and reactive soluble moiety can be used to introduce a small amount of very high molecular weight highly branched material into the distribution. Conversely, a larger amount of a less reactive, lower functionality moiety can be used to introduce more of the branched fraction, but of lower molecular weight.

Generally, modification of the molecular weight distribution is achieved by incorporating during polymerization of the polymers an effective amount of functional reagent selected from the group consisting of polymers and copolymers comprising functional groups capable of copolymerizing or forming a chemical bond with the product polymer, the functional group comprising cationically active halogen or cationically active unsaturation and such polymers and copolymers preferably comprising lyophilic polymerization diluent soluble moiety.

Suitable classes of functional polymeric reagents which are useful as branching agent include reagents that are presented by the following formulas:

(1)

wherein
$R_1$, $R_2$ and $R_3$ = hydrogen or alkyl group
$R_4$, $R_5$ = alkyl group
x = halogen, e.g., chlorine and bromine
n = 4–100
alkyl group having 1 to 15 carbon atoms, preferably 1 to 4; non-limiting examples include methyl and ethyl.

Suitable reagents in this class include chlorinated butyl and brominated butyl.

(2)

wherein
$R_1$ = alkyl (e.g., as in (1), above) or aryl
$R_2$, $R_3$ = alkyl
x = halogen, e.g., chlorine or bromine
n = 4–100
aryl group, including phenyl and tolyl.

Suitable reagents in this class include hydrochlorinated polyisoprene, hydrobrominated polyisoprene, isobutylene-vinylbenzyl chloride copolymer and chlorinated polystyrene.

(3)

wherein
$R_1$, $R_2$ =
hydrogen, alkyl (as in (1) or (2) above,
aryl (as in (2) above) or alkenyl
$R_3$, $R_4$ — alkyl
n = 7–1,000
alkenyl group including ethene and propene Suitable reagents in this class include polybutadiene, polyisoprene and polypiperylene.

The cationically reactive branching agents for use in producing the star-branched polymers are present during polymerization in an amount effective for producing the desired changes in molecular weight distribution. Such amounts vary depending on the number and reactivity of the cationically active species, including such variables as molecular weight and reactivity of the agent (particularly that portion of the agent containing the cationically active moiety). Additionally, polymerization conditions influence the effective concentration, e.g., batch versus continuous, temperature, monomer conversion, etc. Generally, such agents are present in an amount, based on the monomers, greater than about 0.3 weight percent e.g., about 0.3 to about 3.0 weight percent, preferably greater than about 0.35 weight percent, e.g., about 0.35 to about 2.8 weight percent, more preferably greater than about 0.4 to about 2.7 weight percent, e.g., about 0.45 to about 2.6 weight percent, for example greater than about 0.5 weight percent e.g., about 0.5 to about 2.5 weight percent. Reagents which are not excessively reactive can be used in a commercial process at, e.g., about 1.1 to about 2.0 weight percent. The upper limit of concentration is limited to that concentration which causes the final polymer product to be gelled to an extent which is unacceptable for the intended use of the product.

A particularly desirable method of introducing the desired high molecular weight ends branching is to combine the functions of the slurry stabilizer and the branching agent in one species by use of a slurry stabilizer with multiple active sites in an anchor group. The lyophilic portion of the slurry stabilizer solubilizes the anchor group, which contains multiple active sites to produce the desired branched fraction during polymerization, and the lyophilic portion then forms the protective shield around the butyl slurry particles to provide steric slurry stabilization. Block copolymers of polystyrene and polybutadiene or polystyrene and polyisoprene are examples of molecules which combine the functions of slurry stabilization and branching agent when butyl rubbers are polymerized in methyl chloride diluent as in commercial butyl rubber processes. The crosslinking comonomer and/or species containing multiple reactive sites is preferentially soluble under polymerization conditions because then it is more effectively utilized and the branching reactions can be controlled better. Since the crosslinking comonomers are typically low molecular weight liquids, they are soluble in the polymerization diluent of interest, but species containing multiple reactive sites are normally polydienes with limited solubility in the normal butyl polymerization diluent (e.g., methyl chloride) under reaction conditions. The solubility requirement often limits the molecular weight of polydiene which can be used unless it also contains groups which enhance methyl chloride solubility. The choice of these solubilizing groups is restricted by the consideration that they must not poison the polymerization catalyst used or interfere with the polymerization. As noted above, it is particularly desirable that the solubilizing group be a lyophilic polymeric chain that can act as a slurry stabilizer so that it serves dual functions. The use of solubilizing groups makes it possible to utilize higher molecular weight polydienes during slurry polymerization of butyl rubbers in methyl chloride diluent and, hence, makes possible the production of a more highly branched, high molecular weight mode during polymerization. The polymerization diluent can also be changed to one in which the polydiene is more soluble but such a major process change is less desirable from economic and process viewpoints.

The unreacted solid particles present in the solution comprising the star-branched butyl rubber and the organic solvent are particles corresponding to the branching agent used in the preparation of the star-branched butyl rubber.

The Wetting Agent or Wetting Agent Precursor

Water and a suitable wetting agent or a precursor of the wetting agent or a mixture of wetting agent and wetting agent precursor are added to the solution comprising the star-branched butyl rubber, or the halogenated star-branched butyl rubber, the unreacted solid particles of branching agent and the organic solvent prior to the neutralization step, preferably prior to the halogenation step.

Suitable wetting agents for the practice of the present invention are materials which will enable water to wet or coat the surface of the solid particles. By way of example, suitable wetting agents include alkali metal and ammonium salts of alkyl, aryl, alkaryl, aralkyl sufonates, sulfates, and polyether sulfates, fatty acids, ethoxylated fatty acids and the like.

Preferred wetting agents comprise sodium salt of condensed naphthalene sulfonic acid and hydrocarbon soluble saturated aliphatic carboxylic acids having from 6 to 30 carbon atoms. The most preferred saturated aliphatic acid is stearic acid. Precursors of any of these wetting agents can also be used instead or in addition to the wetting agent. The wetting agent precursors, after addition to the solution, are materials which would be converted to the wetting agents either before or during the halogenation reaction. Suitable wetting agent precursors include salts of saturated aliphatic carboxylic acids of metals of Groups IA and IIA of the Periodic Table of Elements, such as the sodium, potassium, beryllium, magnesium, calcium, strontium, and barium salts of these acids and mixtures thereof. A particularly preferred wetting agent precursor is calcium stearate which, under halogenation conditions, is converted to stearic acid. The Periodic Table of Elements referred to herein is in accordance with the Periodic Table published by Sargent Welch Scientific Company, 1968.

Suitable amount of water added prior to neutralization step to the solution comprising the star-branched butyl rubber, unreacted solid particles, and organic solvent include from about 0.1 to about 5.0 weight percent, based on the weight of star-branched butyl rubber present in the solution.

Suitable amount of wetting agent or wetting agent precursor added prior to neutralization to the solution comprising the star-branched butyl, unreacted solid particles, and organic solvent include from about 0.1 to about 2.0 weight percent, preferably from about 0.15 to about 1.0 weight percent, more preferably from about 0.2 to about 0.6 weight percent, based on the weight of the star-branched butyl rubber present in the solution.

The addition of the water and wetting agent or precursor thereof is believed to affect the outer surface of the solid particles of branching agent and to make them hydrophilic. When a hydrocarbon soluble wetting agent, such as stearic acid, is used, not only does the nature of the solid particles appear to be changed, but the stearic acid, in the presence of the alkaline material during the neutralization step, also appears to form a soap in situ (salt of the stearic acid) at the hydrocarbon and water interface which also seems to increase the neutralization rate of the process of the present invention.

The solution comprising the star-branched butyl rubber, the solid branching agent particles, the organic solvent and the wetting agent or wetting agent precursor, if the wetting agent or precursor was added prior to the halogenation step, is contacted with a halogenating agent at halogenation conditions. Suitable halogenating agents include chlorine, bromine, iodine; compounds which liberate chlorine, bromine and iodine and mixture thereof. Preferred halogenating agents are selected from the group consisting of molecular bromine, a compound which liberates molecular bromine, molecular chlorine, a compound which liberates molecular chlorine, and mixtures thereof.

Suitable halogenation temperatures include a temperature ranging from 0° C. to 100° C., preferably from about 20° C. to 80° C., and a pressure ranging from about 0 to about 200 psig.

The halogenation reaction produces a halogenated star-branched butyl rubber and a hydrogen halide by-product corresponding to the halogenation agent used. This hydrogen halide must be neutralized.

The halogenation reaction is conducted for a time sufficient to produce a halogenated star-branched butyl rubber comprising from about 0.05 to about 5 weight percent of chemically bound halogen. When the halogen is chlorine, the preferred amount of chemically bound chlorine ranges from about 0.1 to about 2.0 weight percent. When the halogen is bromine, the preferred amount of chemically bound bromine ranges from about 0.2 to about 4.0 weight percent.

The halogenation reaction product comprising the star-branched butyl rubber containing a chemically bound halogen, solid particles of branching agent, water, a wetting agent or wetting agent precursor, a hydrogen halide by-product, and an organic solvent, is contacted with an aqueous alkaline material to neutralize the hydrogen halide by-product.

Suitable aqueous alkaline materials include alkali metal hydroxides, particularly, sodium hydroxide, ammonium hydroxide, carbonates or bicarbonates of alkali metals and ammonium in an aqueous solution. The aqueous alkaline material is used in an amount sufficient for the alkaline material to react with the undesired hydrogen halide by-product and, thereby, neutralize the hydrogen halide. The neutralization step is generally conducted at a temperature ranging from about minus 10° C. to about 100° C., preferably from about 20° to 75° C. and at a pressure ranging from about 0 to 100 psig, preferably from about 80 to 100 psig for a time sufficient to neutralize the hydrogen halide, that is, until the pH of the neutralization mixture ranges from above about 6 to less than 10, preferably from about 7 to 9.5. Optionally, additives e.g. emulsifiers, may be present or added to the neutralization reaction zone, such as, for example, calcium stearate, epoxidized soybean oil, and non-ionic surfactants. The halogenated star-branched butyl rubber is recovered from the neutralization reaction mixture by any of the conventional processes.

PREFERRED EMBODIMENTS

The following examples are presented to illustrate the invention. Unless otherwise indicated, all parts and percentages are by weight.

In experiments 1 to 9, the experiments were performed as a batch process by introducing a sample of a solution comprising a unhalogenated copolymer dissolved in hexane (hereinafter referred to as "cement") into a reactor, maintained at a temperature ranging from 25° C. to 30° C. and a constant pressure of 180 kPa. The halogenation was conducted by introducing bromine into the reactor in the absence of light for a period of 7 minutes to contact the cement. Subsequently, the neutralization reaction was performed in the same reactor by introducing aqueous sodium hydroxide into the reactor in a 30% molar excess over the theoretical stoichiometric amount required to neutralize the HBr by-product of the halogenation. Samples of partially neutralized cement were withdrawn from the reactor at selected time intervals after a known amount of aqueous sodium hydroxide had been added. The samples were quenched with a known excess amount of diphenylamine to neutralize any remaining HBr in the hydrocarbon phase. The aqueous phase was separated and back titrated with standard HCl to determine the amount of sodium hydroxide remaining. The results of the back titrations were used to calculate the fraction of halogenation by-product hydrobromic acid remaining. The results were summarized on graphs. Example V was conducted in a similar manner except that $Cl_2$ was used instead of the $Br_2$.

Figure 1:
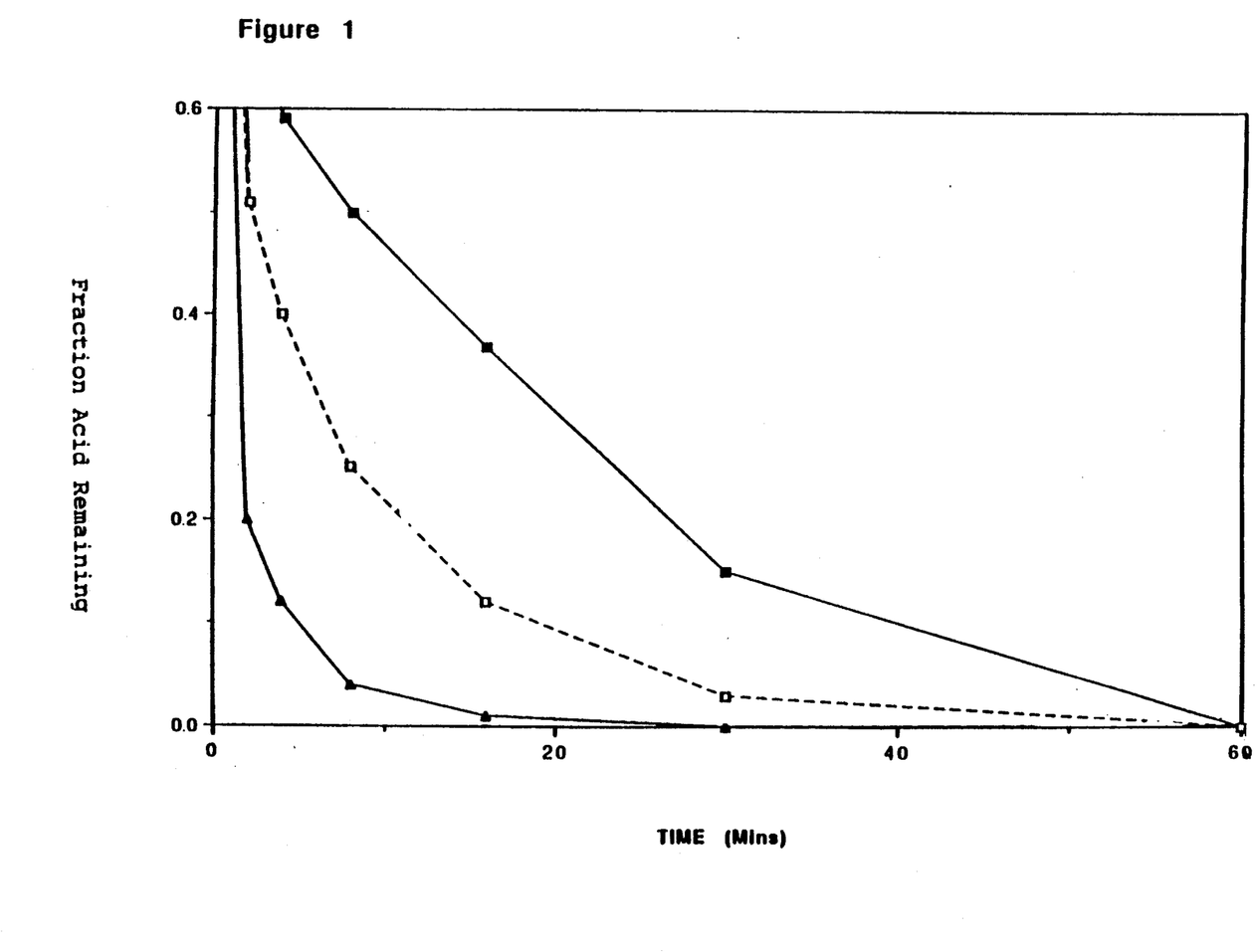
FIG. 1 is a graph showing the fraction of acid remaining versus time for the experiments of Example I.

FIG. 1 shows the fraction of acid remaining in the neutralization step versus time in minutes for the following experiments:

Experiment 1 was performed by neutralizing the halogenation reaction product of a conventional linear (i.e. non-star-branched) copolymer of isoprene and isobutylene having a number average molar weight of 150 K, which had been halogenated in a hexane solution with $Br_2$ to contain 2.0 weight percent chemically bound bromine. This halogenated copolymer is designated herein Copolymer A. The neutralization reaction was conducted by contacting the halogenation reaction product comprising hydrogen bromide with an aqueous sodium hydroxide solution in a 30% molar excess over the theoretical stoichiometric amount of the hydrogen bromide by-product.

Experiment 2 was conducted in a manner similar to Experiment 1 except that instead of the brominated conventional (linear) copolymer of isobutylene and isoprene, Copolymer B was used, that is, a brominated star-branched copolymer of isobutylene and isoprene comprising weight 1.4 weight percent of KRO1-K-resin ® (Phillips Chemical Company) incorporated in the copolymer and 2.4 weight percent chemically bound bromine. KRO1-K-resin ®is a styrene/butadiene block copolymer comprising about 62 mole percent styrene and about 38 mole percent butadiene. KRO1-K-resin ® had a viscosity average molecular weight of 140,000 determined by toluene solution viscosity. The KRO1-K-resin ® had been used as branching agent to make the star-branched copolymer of Experiment 2.

Experiment 3 was conducted in a manner similar to Experiment 2 using the same brominated star-branched copolymer, that is, Copolymer B, except that prior to the halogenation step of the corresponding non-halogenated copolymer, water and a wetting agent were added to a solution comprising the non-halogenated copolymer corresponding to Copolymer B, hexane, unreacted particles of KRO1-K-resin ® (i.e. unreacted branching agent). The wetting agent used was a sodium salt of condensed napthalene sulfonic acid of Rohm and Haas Co.

This wetting agent, in an amount of 0.125 weight percent, and 2.4 weight percent of water, each based on the weight of copolymer B were added to the solution prior to the halogenation step.

As can be seen from FIG. 1, Experiment 3, which was a run in accordance with the present invention, exhibited increased neutralization rate compared to the neutralization rate of Experiment 2, in which there was no addition of wetting agent and water prior to the halogenation step of the same star-branched copolymer.

Experiments 1 and 2 were experiments not in accordance with the present invention. Experiment 1 shows the rate of neutralization of a conventional linear copolymer of isobutylene and isoprene in which the solution being halogenated does not contain solid particles of branching agent.

In FIG. 1, the solid triangle ▲ represents Experiment 1; the solid rectangle ■ represents Experiment 2; the hollow rectangle ☐ represents Experiment 3.

EXAMPLE II [stearic acid + H₂O]

Figure 2:
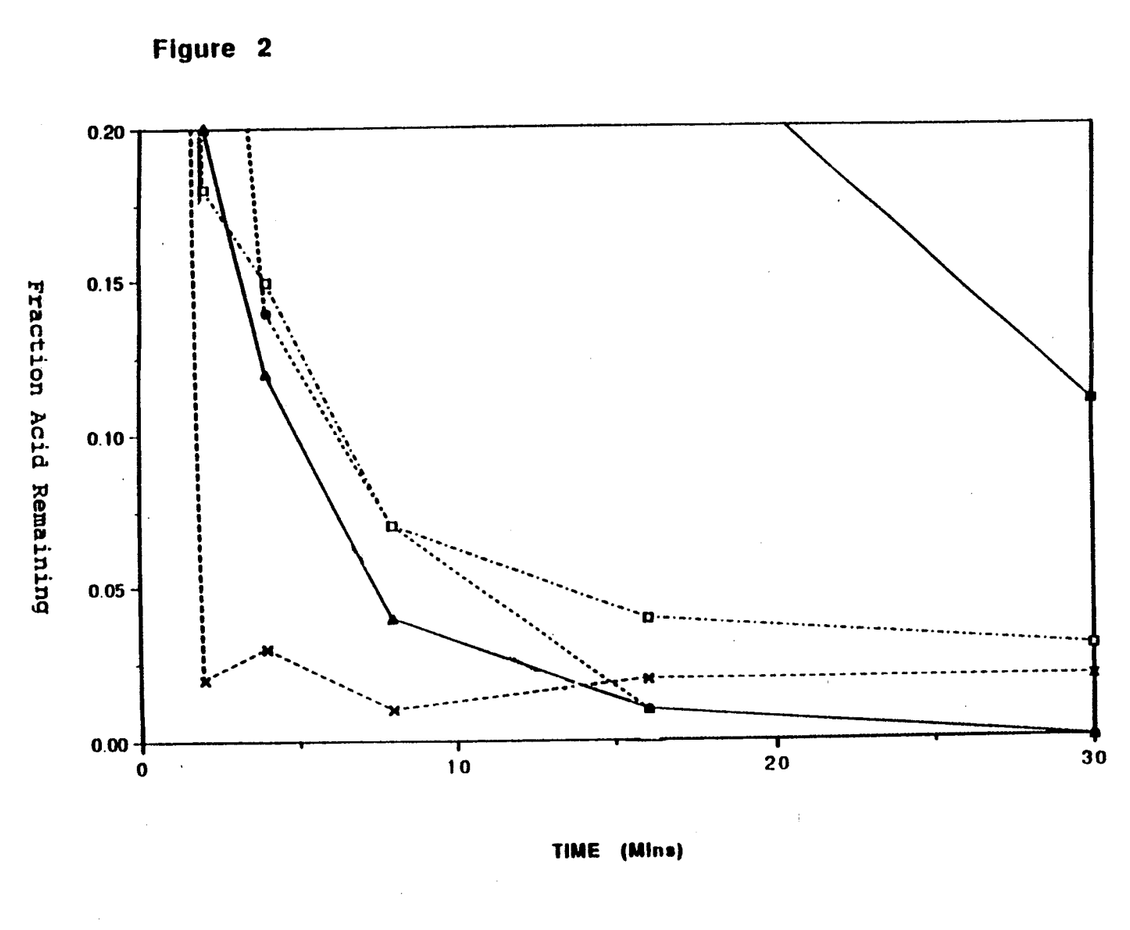
FIG. 2 is a graph showing the fraction of acid remaining versus time for the experiments of Example II.

FIG. 2 shows the fraction of acid remaining versus time for the following experiments:

Experiment 4 was conducted in the same manner as Experiment 2 except that 0.5 weight percent stearic acid and 0.375 weight percent water was added to the solution comprising the non-halogenated star-branched copolymer corresponding to Copolymer B and unreacted solid particles of branching agent prior to the halogenation step.

Experiment 5 was conducted in the same manner as Experiment 4 utilizing the same copolymer except that 0.25 weight percent of stearic acid and 1.0 weight percent of water, based on the copolymer, were added to the solution prior to the halogenation step.

Experiment 6 was conducted in same manner as Experiment 5 except that the amount of water added was changed to 0.5 weight percent based on the copolymer.

Experiments 4, 5, and 6 were experiments in accordance with the present invention. Experiment 2 was an experiment not in accordance with the present invention.

In FIG. 2, the solid triangle represented Experiment 1; the solid rectangle represented Experiment 2; the solid circle represented Experiment 4; the x represented Experiment 5; and the non-soid rectangle represented Experiment 6. Experiments 4, 5, and 6 were experiments in accordance with the present invention.

EXAMPLE III

Experiments were conducted utilizing a wetting agent precursor, namely, calcium stearate dispersed in water as additive prior to the halogenation step.

Figure 3:
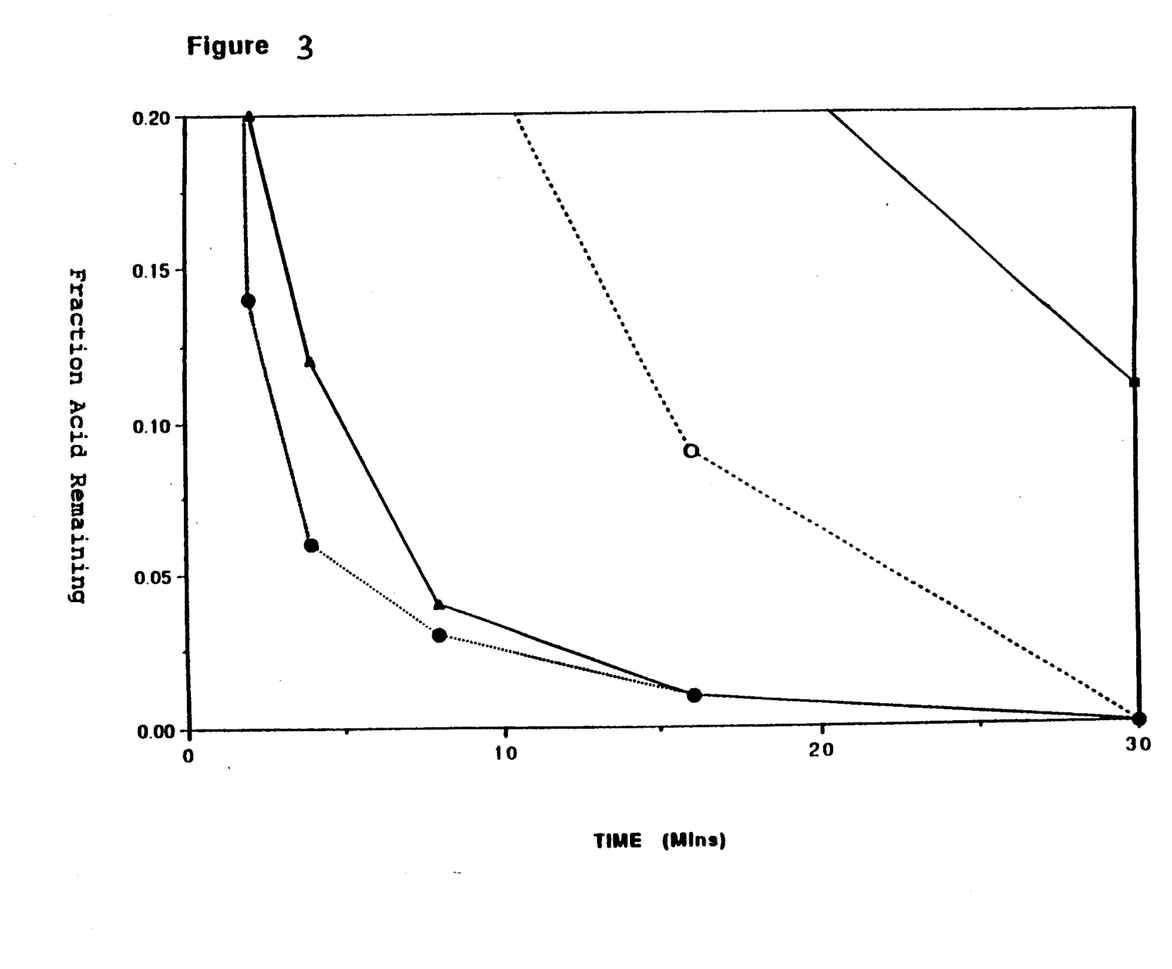
FIG. 3 is a graph showing the fraction of acid remaining versus time for the experiments of Example III.

The results of these experiments are summarized in FIG. 3 in which the fraction of acid remaining is shown versus time.

The experiments were as follows:

Experiment 7 was conducted by adding 0.5 weight percent of calcium stearate based on the copolymer (added as a dispersion of 40 wt % calcium stearate in water) prior to the halogenation step to a solution comprising hexane, solid particles of KROl-resin branching agent and a star-branched copolymer of isobutylene and isoprene which was the same as the not yet halogenated Copolymer B.

Experiment 8 was similar to Experiment 9 except that instead of adding 0.5 wt % calcium stearate based on the copolymer prior to the halogenation step, the calcium stearate (0.5 wt %) was added after the halogenation step.

As can be seen from these experiments, the Experiment 7, gave a significant increase in the rate of neutralization than Experiment 8. Both Experiments 7 and 8 were experiments in accordance with the present invention.

When calcium stearate is added before the halogenation, it is believed to be converted to stearic acid in situ by reaction with the bromine.

In FIG. 3, the open circle represents Experiment 8; the solid circle represents Experiment 7; the solid triangle represents Experiment 1; and the solid rectangle represents Experiment 2.

EXAMPLE IV

Experiments were conducted to determine the neutralization rate of a chlorinated star-branched copolymer of isobutylene and isoprene, herein designated Copolymer F.

Copolymer F had a number average molecular weight of 150k and comprised 1.4 weight percent of a branching agent [KROl] and 1.1 weight percent of chemically bound chlorine.

The experiment 9 was conducted utilizing Copolymer F without adding any stearic acid and water prior to the halogenation.

Experiment 9 was compared to Experiments 1 and 2. As can be seen from FIG. 4, the neutralization rate for the chlorinated star-branched Copolymer F was slower than for the brominated copolymer of isobutylene and isoprene and may be as slow as for the brominated corresponding star-branched copolymer of isobutylene and isoprene.

Experiment 9 is an experiment not in accordance with the present invention.

Figure 4:
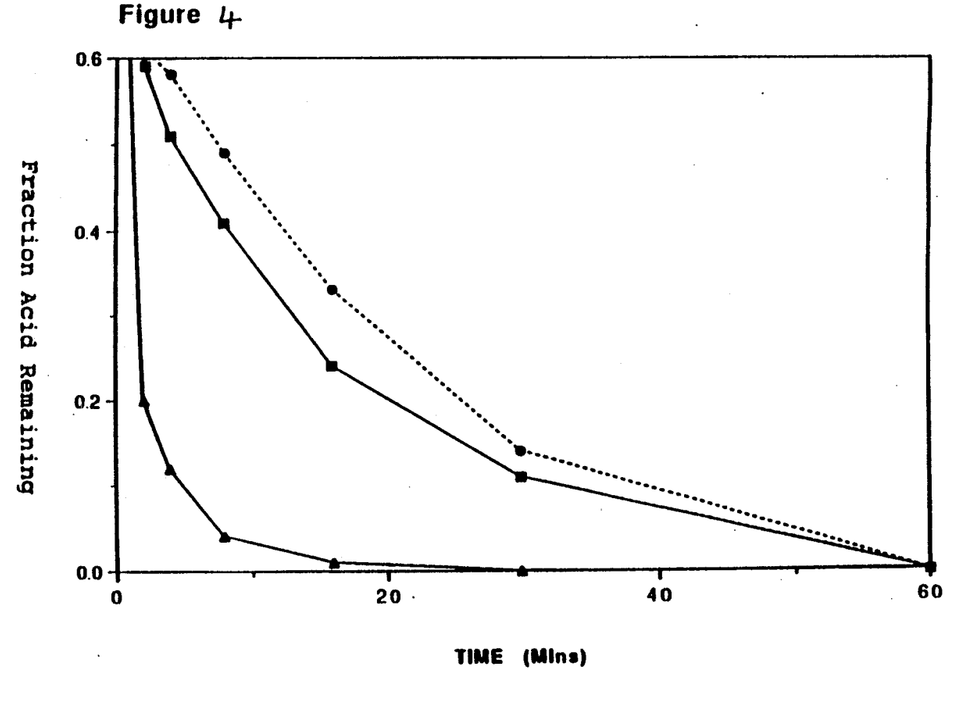
FIG. 4 is a graph showing the fraction of acid remaining versus time for the experiments of Example IV.

The solid rectangle ■ represented Experiment 9, the solid circle ● represented Experiment 2, and the solid triangle ▲ represented Experiment 1.

What is claimed is:

1. In a process for halogenating star-branched copolymer of a $C_4$ to $C_7$ isomonoolefin and a $C_4$ to $C14$ multiolefin, which comprises the steps of:
    (a) contacting a solution comprising said copolymer, solid particles of a branching agent, and an organic solvent for said copolymer with a halogenating agent at halogenation conditions to produce a reaction product comprising the corresponding halogenated copolymer and hydrogen halide;
    (b) neutralizing said hydrogen halide by contacting said reaction product with an aqueous alkaline material to react with said hydrogen halide at neutralization conditions, and
    (c) recovering said halogenated copolymer;
the improvement which comprises adding to said solution, prior to said step (a), water and a wetting agent or a precursor of said wetting agent.

2. The process of claim 1, wherein said wetting agent is selected from the group consisting of alkali metal and ammonium salts of alkyl, aryl, alkaryl, aralkyl sufonates; alkali metal and ammonium salts of alkyl, aryl, alkaryl, aralkyl sulfates, and polyether sulfates; fatty acids; ethoxylated fatty acids and mixtures thereof.

3. The process of claim 1, wherein said wetting agent is a sodium salt of a condensed naphthalene sulfonic acid.

4. The process of claim 1, wherein said wetting agent is a hydrocarbon-soluble wetting agent selected from the group consisting of a saturated aliphatic carboxylic acid having from 6 to 30 carbon atoms.

5. The process of claim 4, wherein said saturated aliphatic carboxylic acid is stearic acid.

6. The process of claim 1, wherein said wetting agent precursor is added to said solution prior to step (a) and wherein said wetting precursor is selected from the group consisting of a metal salt of a saturated aliphatic carboxylic acid having from 6 to 30 carbon atoms, the metal constituent of said salt being selected from the group consisting of Group IA, Group IIA and mixtures thereof of the Periodic Table of Elements.

7. The process of claim 6, wherein said salt comprises calcium stearate.

8. The process of claim 1, wherein said wetting agent or said wetting agent precursor is added to said solution in an amount ranging from about 0.1 to about 2.0 weight percent, based on said star-branched copolymer.

9. The process of claim 7, wherein said wetting agent or said wetting agent precursor is added to said solution in an amount ranging from about 0.15 to about 1.0 weight percent, based on said star-branched copolymer.

10. The process of claim 1, wherein said water is added to said solution in an amount ranging from about 0.1 to about 5.0 weight percent, based on said star-branched copolymer.

11. The process of claim 1, wherein said halogenating agent is selected from the group consisting of chlorine, bromine, iodine; compounds which liberate chlorine, bromine and iodine, and mixtures thereof.

12. The process of claim 1, wherein said halogenating agent is selected from the group consisting of molecular bromine, a compound which liberates molecular bromine, molecular chlorine, a compound which liberates molecular chlorine, and mixtures thereof.

13. The process of claim 1, Wherein said halogenation conditions include a temperature ranging from about 0° C. to about 100° C., and a pressure ranging from about 0 to about 200 psig.

14. The process of claim 1, wherein said neutralization conditions include a temperature ranging from about minus 10° C. to about 100° C., and a pressure ranging from about zero to about 100 psig.

15. The process of claim 1, wherein said organic solvent is selected from the group consisting of a hydrocarbon, a halogenated hydrocarbon derivative, and mixtures thereof.

16. The process of claim 14, wherein said organic solvent is hexane.

17. The process of claim 1, wherein after step (b), the pH of the resulting neutralization mixture ranges from about 6 to less than 10.

18. The process of claim 17, wherein said pH ranges from about 7 to 9.5.

* * * * *